April 27, 1965  A. ROMEK  3,180,463
COMPOSITE GIRDER ASSEMBLY
Filed Dec. 27, 1961  2 Sheets-Sheet 1
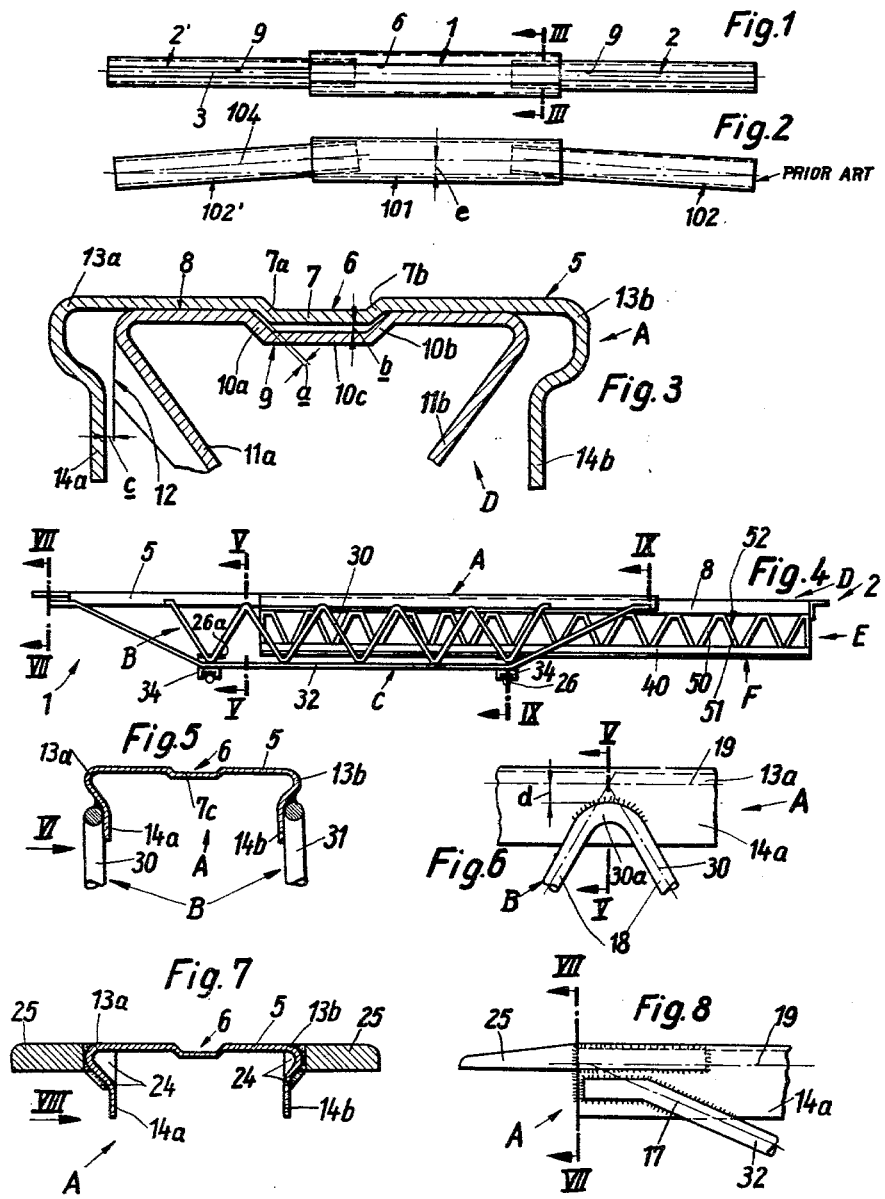

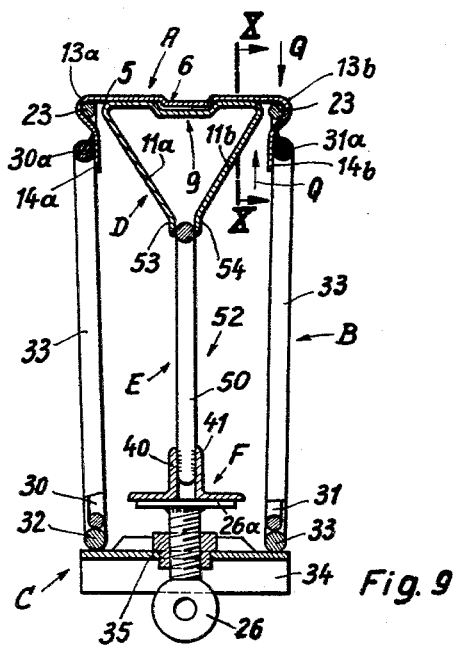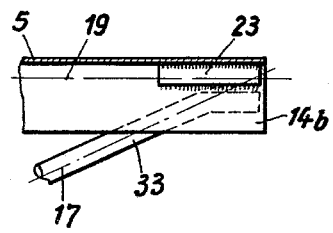

3,180,463
COMPOSITE GIRDER ASSEMBLY
Arpad Romek, Dusseldorf, Germany, assignor to Seco, Steel Equipment Company p.v.b.a., Schoten, Antwerp, Belgium
Filed Dec. 27, 1961, Ser. No. 162,607
Claims priority, application Germany, Dec. 30, 1960, R 29,375, R 29,376
3 Claims. (Cl. 189—37)

The present invention relates to girders or beams in general, and more particularly to a composite girder assembly of variable length which is especially suited for use in concrete shaping forms, such as shutterings and the like. Such girder assemblies usually comprise an outer supporting member or girder and one or two inner supporting members or girders which are telescoped into and are longitudinally movable with respect to the outer supporting member.

An important object of the invention is to provide a composite girder assembly of the just outlined characteristics which is constructed and arranged in such a way that, when subjected to static loads, the inner supporting member or members will remain in longitudinal alignment with the outer supporting member even if the inner supporting members are loosely receivable in the outer supporting member.

Another object of the invention is to provide very simple and reliable aligning means between the inner and outer supporting members of a composite girder assembly.

A further object of the invention is to provide aligning means of the just described type which, in addition to preventing lateral movements of the telescoped supporting members, simultaneously reinforce the top flanges of the supporting members.

An additional object of the invention is to provide a composite girder assembly of the above outlined characteristics wherein the aligning means may be formed at the time the supporting members are manufactured in accordance with a cold forming process or in any other suitable way.

A concomitant object of the invention is to provide a novel outer supporting member for composite girder assemblies of the above outlined characteristics.

A further object of the invention is to provide a novel inner supporting member for composite girder assemblies of the above outlined characteristics.

With the above objects in view, the invention resides in the provision of a composite girder assembly for concrete shaping forms such as shutterings and the like, which comprises an elongated substantially tubular outer supporting member, at least one elongated inner supporting member telescoped into and longitudinally slidable in the outer supporting member, and means provided on the supporting member for aligning the inner supporting member with the outer supporting member, this aligning means comprising elongated rib means provided on one of the supporting members and elongated rib-receiving groove means formed in the other supporting member. It is preferred to provide the groove means and the rib means in the top wall portions of the upper flanges which form part of the respective supporting members, and these groove and rib means are preferably defined by elongated corrugations formed in such a way that the corrugation or corrugations in the top wall portion of the top flange forming part of the outer supporting member define one or more downwardly extending ribs, and that the corrugation or corrugations in the top wall portion of the other upper flange define complementary grooves in which the ribs are received to maintain the upper flanges in alignment when the inner supporting member is longitudinally displaced with respect to the outer supporting member or vice versa.

The novel features which are considered as characteristic of the invention are set forth in particular in the appended claims. The invention itself, however, both as to its construction and its method of operation, together with additional objects and advantages thereof, will be best understood from the following detailed description of a specific embodiment with reference to the accompanying drawings, in which:

FIG. 1 is a schematic top plan view of a composite girder assembly which embodies my invention;

FIG. 2 is a similar schematic top plan view of a conventional girder assembly;

FIG. 3 is a greatly enlarged fragmentary transverse section as seen in the direction of arrows from the line III—III of FIG. 1;

FIG. 4 is an enlarged side elevational view of two telescoped supporting members or girders which form part of the girder assembly shown in FIG. 1;

FIG. 5 is an enlarged fragmentary transverse section as seen in the direction of arrows from the line V—V of FIG. 4 or 6, showing the manner in which the undulate portions of the web are welded to the side wall portions of the upper flange forming part of the outer supporting member;

FIG. 6 is an enlarged fragmentary side elevational view of the upper flange as seen in the direction of the arrow VI in FIG. 5;

FIG. 7 is an enlarged transverse section seen in the direction of arrows from the line VII—VII of FIG. 5 or 8 showing one form of stiffening means for the beads which form part of the upper flange in the outer supporting member;

FIG. 8 is a fragmentary side elevational view of one longitudinal end of the upper flange as seen in the direction of the arrow VII in FIG. 7;

FIG. 9 is an enlarged transverse section as seen in the direction of arrows from the composite line IX—IX of FIG. 4, showing the manner in which the inner supporting member is received and guided in the outer supporting member; and FIG. 10 is an enlarged fragmentary section as seen in the direction of arrows from the line X—X of FIG. 9, showing the manner in which a different stiffening member is connected to the beaded side wall portion of the upper flange in the outer supporting member.

Referring now in greater detail to the drawings, and first to FIG. 1, there is shown a composite girder assembly which comprises an outer supporting member or girder 1 and two inner supporting members or girders 2, 2' which are respectively telescoped into opposite longitudinal end portions of the outer supporting member 1. The top wall portions of the upper flanges forming part of supporting members 1 and 2, 2' are respectively formed with corrugations 6 and 9 which define downwardly extending ribs and grooves, and the rib of the upper flange forming part of the outer supporting member 1 is slidably received in the grooves of the upper flanges forming part of the inner supporting members 2, 2' so that the supporting members are maintained in longitudinal alignment with each other. As shown, the longitudinal central plane of symmetry 3 of the inner supporting member 2' coincides with the symmetry planes of the supporting members 1 and 2.

FIG. 2 illustrates a conventional girder assembly whose upper flanges are without corrugations of the type shown in FIG. 1. It will be noted that the inner supporting members 102, 102' are swingable laterally with respect to the outer supporting member 101 so that the plane of symmetry 104 of the inner supporting member 102' encloses an obtuse angle with the central plane of symmetry of the outer supporting member 101. The lateral play of the inner supporting members 102, 102' reaches a maximum magnitude when the inner supporting members are nearly completely withdrawn from the outer supporting member. This lateral play decreases if the overlapped ends of the inner supporting members are moved toward the central portion of the outer supporting member. As is known, it is necessary that the maximum width of the upper flanges forming part of the inner supporting members be somewhat less than the width of the space in the upper flange of the outer supporting member in which the upper flanges of the inner supporting members are received. This difference is usually within a range of 4–5 mm., and it causes a lateral play indicated in FIG. 2 by the reference character $e$. The supporting members 101, 102, 102' will be misaligned in a manner as shown in FIG. 2 in response to comparatively small lateral stresses regardless of whether such stresses arise before or while the composite girder assembly of FIG. 2 is subjected to loads acting in directions which are perpendicular to their top flanges, i.e. to such loads which arise when the assembly of FIG. 2 is utilized in a shuttering for propping up concrete ceilings or the like. Consequently, a conventional girder assembly cannot be subjected to such stresses which would be permissible were its girders aligned in a manner as shown in FIG. 1.

FIG. 3 illustrates the construction of the upper flange A of the outer supporting member 1 and of the upper flange D of the inner supporting member 2. As shown, the upper flange A comprises a top wall portion 5 which assumes the form of a horizontally extending elongated plate made of sheet metal or a like metallic material and having a central corrugation 6 which defines a downwardly extending rib and a groove which is formed in the upper side of the top wall portion 5. The corrugation 6 is of trapeziform cross section by consisting of two mutually inclined downwardly extending and inwardly converging lateral portions 7a, 7b and of an intermediate or bottom portion 7c.

The upper flange D of the inner supporting member 2 comprises a substantially plate like top wall portion 8 which is formed with a corrugation 9 defining a downwardly extending rib and a groove which is formed in the upper side of the top wall portion 8. The corrugation 9 also comprises two mutually inclined downwardly extending and inwardly converging lateral portions 10a, 10b and a bottom portion 10c which is slightly spaced from the bottom portion 7c so that a gap $b$ develops between the bottom portions 7c, 10c to receive any foreign matter which would otherwise accumulate between the upper side of the top wall portion 8 and the underside of the top wall portion 5. The tolerances $a$ between the lateral wall portions 7a, 10a and 7b, 10b are minimal so that it can be said that the lateral portions of the two corrugations actually abut against each other to prevent any lateral movements of the outer supporting member 1 with respect to the inner supporting member 2, or vice versa.

The upper flange A of the outer supporting member 1 is of inverted U-shape and comprises two substantially parallel vertical side wall portions 14a, 14b, respectively provided with beaded upper end portions 13a, 13b, and these beaded portions are integral with the top wall portion 5. The upper flange D of the inner supporting member 2 comprises two inwardly bent side wall portions 11a, 11b so that the upper flange D assumes a substantially triangular form. The side wall portions 11a, 11b need not come into actual engagement with the side wall portions 14a, 14b because the corrugations 6, 9 provide sufficient guidance for the supporting members to prevent any excessive lateral displacements between the telescoped upper flanges A, D. The beaded upper end portions 13a, 13b are preferrably formed by a cold rolling process, and their purpose is to bring as much metallic material as possible into the general plane of the wall portion 5 which latter is subjected to greatest stresses when the composite girder assembly of my invention is put to actual use.

The corrugations 6 and 9 may be rolled into the top wall portions of the upper flanges A, D when the supporting members 1, 2 are manufactured. Such corrugations may be formed with sufficient precision so that the underside of the top wall portion 5 will be in face-to-face abutment with the upper side of the top wall portion 8 while the lateral portions 7a, 7b may but need not abut against the lateral portions 10a, 10b. The provision of the space or gap $b$ insures that any foreign matter which would normally accumulate between the abutting sides of the top wall portions 5, 8 automatically moves into this gap so as not to interfere with proper supporting engagement between the upper flanges A, D. Of course, the corrugations also serve as a means for reinforcing the upper flanges, particularly if the girder assembly consists of supporting members whose upper flanges are formed with two or more longitudinally extending corrugations. However, it is normally sufficient to provide a single centrally located corrugation in the top wall portion of each upper flange. While it is equally possible to form the upper flanges of the supporting members with substantially V-shaped corrugations, trapeziform corrugations are preferred because the material of the top wall portions remains closer to the upper sides thereof which improves the rigidity of the supporting members. The equatorial moment of resistance of an upper flange formed with one or more trapeziform corrugations is higher than the equatorial moment of resistance of an upper flange with triangular or V-shaped corrugations.

The manner in which the upper flange D of the inner supporting member 2 is prevented from descending in a direction downwardly and away from the top wall portion 5 of the upper flange A of the outer supporting member 1 is illustrated in FIGS. 5 and 9.

The web of the outer supporting member 1 comprises two undulate or zig-zag shaped sections 30, 31 whose crests are respectively welded to the outer sides of the side wall portions 14a, 14b (see FIGS. 5 and 6) and whose lowermost portions are respectively welded to median portions of two elongated bars 32, 33 forming part of the lower flange C. As shown in FIG. 9, the sections 30, 31 consist of metallic bar stock of circular cross section and their diameters approximate the width of the beads 13a, 13b. The lower flange C of the outer supporting member 1 further comprises a pair of spaced traverses 34 of the type disclosed in my copending application Serial No. 162,606, filed December 27, 1961, entitled "Angle Beam," and each of these traverses is provided with a central opening for a nut 35 meshing with an eye bolt 26 provided with a supporting plate 26a for the lower flange F of the inner supporting member 2. By turning the bolt 26, the operator may move the upper flange D of the inner supporting member 2 toward or away from the top wall portion 5 of the upper flange A. The traverses 34 are welded to the undersides of the bars 32, 33 so that the outer supporting member consisting of the inverted U-shaped upper flange A, of the lower flange C (including the bars 32, 33 and the traverses 34), and of the web B (including the sections 30, 31) forms a rigid unit. The longitudinal end portions of the bars 32, 33 are bent upwardly and are respectively welded to the outer sides of the side wall portions 14a, 14b.

The exact construction of the inner supporting member 2, save for the corrugation 9 in the wall portion 5 of its upper flange D, is described in my copending application Serial No. 162,604, filed December 27, 1961, entitled "Built-up Girder for Concrete Shaping Forms and the Like." The lower flange F of this inner supporting member 2 consists of two profiled beams or angles 40, 41 whose upwardly extending portions are spaced from each other to define a gap for the lower extremities of legs 50, 51 forming part of inverted U-shaped sections 52 which latter together constitute a web E. The crests of the sections 52 are received between and are welded to outwardly flaring lower end portions 53, 54 of the side walls 11a, 11b forming a part of the upper flange D, i.e. the end portions 53, 54 straddle the crests of the sections 52.

The angles 40, 41 of the lower flange F rest on and are slidable along the supporting plates 26a of the eye bolts 26 when the inner supporting member 2 is telescoped into or is withdrawn from the outer supporting member 1. The lower extremities of the sections 52 which together constitute the web E of the inner supporting member 2 are welded to the inner sides of the angles 40, 41.

When the operator desires to withdraw the inner supporting member 2, he turns the eye bolts 26 in a direction to move the top wall portion 8 away from the top wall portion 5, i.e. to lower the inner supporting member with respect to the upper flange A, whereupon the inner supporting member can be readily shifted in the longitudinal direction of the outer supporting member.

The guide brackets 12 of FIG. 3 are of particular advantage when the composite girder assembly of FIG. 4 is in partly extended position so that the inner supporting member rests only on the top plate of the right-hand eye bolt 26. If the operator desires to lower the inner supporting member by operating the right-hand eye bolt 26, the left-hand end portion of the member 2 is likely to descend to such an extent that the bottom portion 7c of the corrugation 6 is located at a level above the upper side of the top wall portion 8 so that, in the absence of the bracket or brackets 12, the inner supporting member would be free to swing laterally with respect to the outer supporting member which would result in excessive misalignment of the supporting members. The tolerance c between the end face of the bracket 12 and the inner side of the wall portion 14a may be in the range of 4–5 mm. since some lateral play is permissible when the supporting members are not in actual engagement with the ceiling.

Referring back to FIG. 3, it will be noted that one or both longitudinal ends of at least one of the side wall portions 11a, 11b of the upper flange D are provided with outwardly extending abutment members or brackets 12 which enable the operator to properly introduce the rib of the corrugation 6 into the groove of the corrugation 9 when the two supporting members are assembled in a manner as shown in FIG. 4. The bracket or brackets 12 need not come into actual abutment with the side wall portion 14a when the inner supporting member 2 is telescoped into the space defined by the upper flange A, by the sections 30, 31 and by the lower flange C of the outer supporting member 1, i.e. a gap c may remain between the outer end face of the bracket 12 and the inner side of the wall portion 14a.

While the beads 13a, 13b improve the strength of the top wall portion 5 intermediate the longitudinal ends thereof, they could reduce the stiffness of the top wall portion 5 at the longitudinal ends thereof. Therefore, it is advisable to stiffen the longitudinal end portions of the beads 13a, 13b in a manner as illustrated in FIGS. 7–8 and/or 9–10. As shown in FIGS. 7 and 8, the longitudinal end portion of each bead may be provided with a claw member 25 which is welded to the convex outer side of the respective bead and which projects beyond the respective longitudinal end of the upper flange A. The claw member 25 has comparatively small downwardly projecting extensions or flaps 24 which are directly welded to the longitudinal end portions of the respective beads 13a, 13b.

FIGS. 9 and 10 illustrate different stiffening means in the form of rods or studs 23. Each of these stiffening means is welded to the concave inner side of the respective bead 13a, 13b at the longitudinal ends thereof. The rods 23 fill up the spaces between the underside of the top wall portion 5 and the vertical portions of the side walls 14a, 14b to prevent collapsing of the upper flange A under high stresses which are particularly felt at both longitudinal ends of the upper flange. FIG. 9 illustrates the directions in which the shearing forces Q act at the longitudinal ends of the upper flange A. These shearing forces attain maximum magnitude in the end portions of the outer supporting member, i.e. in the zones of section lines VII—VII and IX—IX in FIG. 4. The upwardly directed shearing force transmitted by the top wall portion 8 of the upper flange D is transmitted to the top wall portion 5 and to the reinforced terminals of the side wall portions 14a, 14b.

An important advantage of the outer supporting member 1 is that the axes 18 of the diagonally extending portions of the undulate sections intersect each other in the plane of the neutral axis 19 of the upper flange A (see FIG. 6). This renders it possible to change the configuration of the crests 30a, 31a of the respective sections 30, 31 in such a way that the distance d between the crests 30a, 31a and the plane of the neutral axis 19 is less in the median portion than at the longitudinal ends of the outer supporting member 1 (see FIG. 4). The beads 13a, 13b add to the width of the top wall portion 5, i.e. the ceiling-engaging upper side of this top wall portion is of greater area than in conventional girders in which the side wall portions and the top wall portion enclose an angle of 90 degrees with each other, i.e. which are without the beads 13a, 13b.

The axes of the diagonal portions of the sections 32, 33 are identified by reference numerals 17.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A composite girder assembly comprising, in combination, an elongated outer girder including a pair of spaced side walls and a top wall portion having an underside; an elongated inner girder longitudinally slidably received in said outer girder and including a top wall portion having an upper side, the width of said inner girder being smaller than the spacing between said side walls of the outer girder so as to leave a predetermined lateral play along said side walls; adjusting means mounted on said outer girder for normally positioning said inner girder at a normal operating level but adapted to lower at least a portion of said inner girder relative to said outer girder; and aligning means including at least one longitudinal rib extending downwardly from said underside of said top wall portion of the outer girder, and at least one longitudinal groove in said upper side of said top wall portion of the inner girder, said rib and groove engaging each other with a lateral play smaller than said predetermined lateral play along said side walls when said inner girder is at said normal operating level, whereby during normal operation said rib and groove will maintain said outer and inner girders in longitudinal alignment with each other but when at least said portion of said inner girder is lowered and thereby said rib and groove are at least partly disengaged from each other said inner girder may be guided with the aid of said side walls of said outer girder.

2. A composite girder assembly comprising, in combination, an elongated outer girder including an upper flange having a substantially plate-like top wall portion, said top wall portion having an underside and at least one longitudinal rib extending downwardly from said underside; an elongated inner girder longitudinally slidably received in said outer girder at a normal operating level and including an upper flange having a substantially plate-like top wall portion, said last mentioned top wall portion having an upper side and at least one longitudinal groove in said upper side, said rib being normally slidably received in said groove to maintain said outer and inner girders in longitudinal alignment with each other; adjusting means mounted on said outer girder for normally positioning said inner girder at said operating level but adapted to lower at least a portion of said inner girder relative to said outer girder; and vertical guiding means disengaged while said inner girder is at said normal operating level but engageable to steady said inner girder when at least said portion of said inner girder is lowered and thereby said rib is at least partly withdrawn from said groove.

3. A girder assembly as set forth in claim 2, in which said upper flange of the outer girder includes a pair of spaced integral substantially plate-like side walls generally forming an inverted U-shape in conjunction with said top wall portion thereof, and each of said side walls has an outwardly bent upper end portion defining a hollow lateral bead, and in which said upper flange of the inner girder has a hollow triangular cross section, and said vertical guiding means includes lateral brackets on said inner girder, said lateral brackets being normally spaced from said side walls of the outer girder but adapted to engage said side walls when said inner girder is at least partially lowered.

References Cited by the Examiner

UNITED STATES PATENTS 3,008,556  11/61  Hinze _____ 189—37
3,023,863  3/62   Klaus _____ 189—37

FOREIGN PATENTS 1,037,055  4/53  France.

BENJAMIN BENDETT, *Primary Examiner.*

C. D. ANGEL, JACOB L. NACKENOFF, *Examiners.*